United States Patent [19]
Miyazaki et al.

[11] Patent Number: 4,911,016
[45] Date of Patent: Mar. 27, 1990

[54] SEMICONDUCTOR STRAIN GAUGE BRIDGE CIRCUIT

[75] Inventors: Atsushi Miyazaki, Katsuta; Ryoichi Kobayashi, Ibaraki, both of Japan

[73] Assignee: Hitachi, Ltd., Tokyo, Japan

[21] Appl. No.: 310,018

[22] Filed: Feb. 13, 1989

Related U.S. Application Data

[63] Continuation of Ser. No. 26,261, Mar. 16, 1987, abandoned.

[30] Foreign Application Priority Data

Mar. 26, 1986 [JP] Japan .................... 61-65713

[51] Int. Cl.⁴ .............................. G01L 1/00
[52] U.S. Cl. ......................... 73/766; 73/708
[58] Field of Search ............ 338/3; 73/766, 708, 73/862.63, 720, 721, 726, 727; 323/366

[56] References Cited

U.S. PATENT DOCUMENTS

| 3,717,038 | 2/1973 | Plett et al. | 73/115 |
| 3,967,188 | 6/1976 | Spencer | 73/708 |
| 4,173,148 | 11/1979 | Yamada et al. | 73/766 |
| 4,414,853 | 11/1983 | Bryzek | 73/766 |
| 4,463,274 | 7/1984 | Swartz | 307/491 |
| 4,480,478 | 11/1984 | Sato et al. | 73/708 |
| 4,510,813 | 4/1985 | Kanazawa | 73/766 |

FOREIGN PATENT DOCUMENTS

| 0169414 | 7/1985 | European Pat. Off. |  |
| 0037417 | 2/1984 | Japan | 73/708 |
| 2113849 | 8/1983 | United Kingdom |  |

Primary Examiner—Robert R. Raevis
Attorney, Agent, or Firm—Antonelli, Terry & Wands

[57] ABSTRACT

A semiconductor strain gauge bridge circuit device is disclosed to include a bridge circuit of semiconductor strain gauges, a first zero-point temperature compensation circuit connected to one of a pair of output terminals of the bridge circuit and including a voltage-dividing resistor circuit generating a voltage substantially equal to a potential appearing at the one output terminal at a predetermined temperature, and a second zero-point temperature compensation circuit connected to the other of the output terminals and including a resistive element having a temperature characteristic similar to that of the semiconductor strain gauges.

6 Claims, 7 Drawing Sheets

SEMICONDUCTOR STRAIN GAUGE BRIDGE CIRCUIT

This application is a continuation of application Ser. No. 026,261, filed on Mar. 16, 1987 now abandoned.

BACKGROUND OF THE INVENTION

This invention relates to a bridge circuit composed of semiconductor strain gauges, and more particularly to a semiconductor strain gauge bridge circuit device including a zero-point temperature compensation circuit for compensating a temperature-dependent drift of a zero-point output of the bridge circuit.

Pressure transducers including a bridge circuit of semiconductor strain gauges for transducing a pressure utilizing the piezoresistive effect of a semiconductor are already widely known and used. However, because the resistance value and piezoresistance coefficient of the semiconductor forming the strain gauges are very sensitive to a temperature change, the semiconductor strain gauges are defective in that their output sensitivity and zero points are greatly adversely affected by the temperature change. Therefore, suitable temperature compensation means is required for detecting an exact amount of strain of the semiconductor strain gauges.

A zero-point temperature compensation circuit is known in which fixed resistors are connected in series and parallel with one of semiconductor strain gauges incorporated in adjacent two branches of a bridge circuit, so that the temperature-resistance characteristic of that semiconductor strain gauge coincides with that of the other semiconductor strain gauge. However, this arrangement is difficult to employ because complex calculations are required to determine the resistance values of these fixed resistors. Further, the prior art arrangement has been defective in that, because one of the fixed resistors is connected in series with one of the semiconductor strain gauges in the bridge circuit, many connection points between the bridge circuit and associated circuits are required. Many, for example, five or more connection terminals have been required which include a pair of power supply terminals of the bridge, a pair of output terminals of the bridge, and one of the terminals of the semiconductor strain gauge to which the series resistor is connected.

Such a prior art problem is solved by an invention disclosed in, for example, U.S. Pat. No. 4,480,478 issued to Sato et al on Nov. 6, 1984. According to the disclosure of the invention described above, there is provided a circuit for generating a voltage equal to a midpoint voltage appearing at a middle point (an output terminal) of a semiconductor strain gauge bridge circuit, at a predetermined temperature, and this voltage is connected through a resistor to one of the output terminals of the bridge circuit. That is, the zero-point temperature compensation of the bridge circuit of the semiconductor strain gauges is attained by adjusting so that the zero-point output of the bridge circuit at a first predetermined temperature $t_1$, such as the room temperature, and the zero-point output at a second predetermined temperature $t_2$ higher than the first predetermined temperature $t_1$ are equal to each other.

However, although the desired zero-point temperature compensation at temperatures between the first predetermined temperature $t_1$ and the second predetermined temperature $t_2$ can be satisfactorily made according to the prior art disclosure, the prior invention disclosed in the Sato patent has the drawback that sufficient temperature compensation cannot be attained at other temperatures, that is, in a temperature range lower than $t_1$ or higher than $t_2$. Referring to JP-A-58-140604 regarding this drawback, the zero-point temperature compensation is not done by changing the shape of the temperature characteristic curve of the bridge circuit, but, instead, the characteristic curve is rotated around a reference point $V_{01}$ to widen the flat portion of the characteristic curve as seen in FIG. 4 of the publication. Thus, when the temperature characteristic of the bridge circuit itself includes a nonlinear curvature occurring outside of the predetermined temperature range described above, this nonlinear curvature of the temperature characteristic cannot be compensated. As a result, the zero-point output of the bridge will undergo a nonlinear drift relative to a temperature change, and it is unable to attain the desired zero-point temperature compensation with high accuracy over a wide temperature range.

SUMMARY OF THE INVENTION

With a view to obviate the prior art defect pointed out above, it is a primary object of the present invention to provide a semiconductor strain gauge bridge circuit device including a zero-point temperature compensation circuit capable of compensating a temperature-dependent drift of the zero-point output with high accuracy over a wide temperature range.

The above object of the present invention is attained by a semiconductor strain gauge bridge circuit device in which a circuit generating a voltage equal to a midpoint voltage appearing at an output terminal of a semiconductor strain gauge bridge circuit at a predetermined temperature is connected to one of the output terminals of the bridge circuit, and a compensation circuit formed by combining a resistor with a temperature sensitive element such as a thermistor having a temperature-resistance characteristic similar to the temperature characteristic of the output of the semiconductor strain gauge bridge circuit is connected to the other output terminal in parallel with the semiconductor strain gauge connected to the other output terminal.

The temperature characteristic of the combination of the thermistor and the resistor constituting the compensation circuit, which characteristic is similar to the nonlinear temperature characteristic of the output of the semiconductor strain gauge bridge circuit, is utilized to compensate the voltage or current at one of the pair of output terminals of the bridge circuit, whereby the zero-point temperature characteristic of the bridge circuit can be compensated over a wide temperature range.

DESCRIPTION OF THE PREFERRED EMBODIMENTS

Preferred embodiments of the semiconductor strain gauge bridge circuit device according to the present invention will now be described in detail with reference to the drawings.

Figure 1:
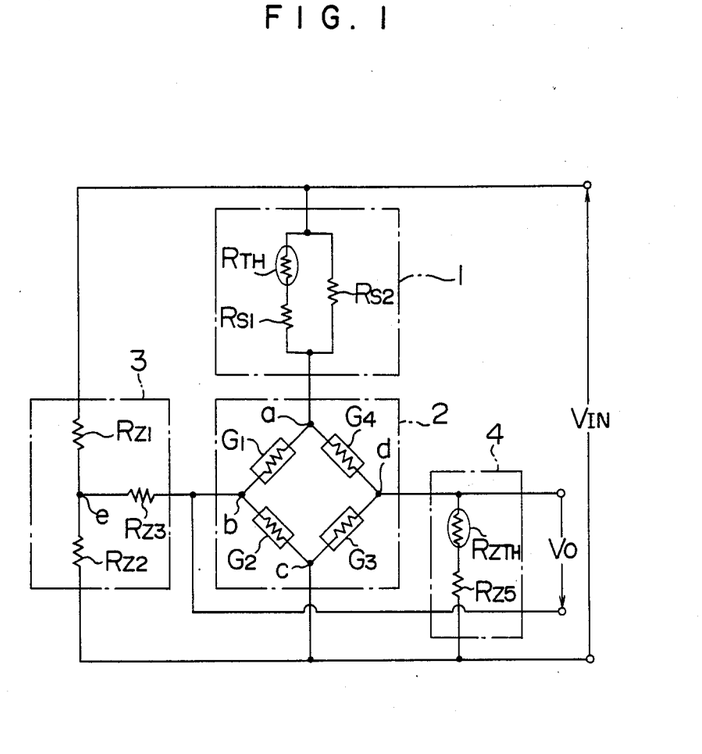
FIG. 1 is a circuit diagram of a preferred embodiment of the semiconductor strain gauge bridge circuit device according to the present invention.

Referring to FIG. 1, a plurality of semiconductor strain gauges $G_1$ to $G_4$ constitute a bridge circuit 2 having a pair of power supply terminals a, c and a pair of output terminals b, d. A so-called sensitivity temperature compensation circuit 1 composed of a thermistor $R_{TH}$ and fixed resistors $R_{S1}$, $R_{S2}$ is connected in series with one of the power supply terminals a of the bridge circuit 2 to compensate the temperature dependent sensitivity of the bridge of the semiconductor strain gauges $G_1$ to $G_4$. The symbol $V_{IN}$ in FIG. 1 designates an input power supply voltage. A so-called zero-point temperature compensation circuit 3 composed of resistors $R_{Z1}$ to $R_{Z3}$ is connected through the resistor $R_{Z3}$ to one of the output terminals b of the bridge circuit 2. The input power supply voltage $V_{IN}$ is divided by the resistors $R_{Z1}$ and $R_{Z2}$ in the zero-point temperature compensation circuit 3, and the resultant voltage appearing at the connection point e between these two resistors $R_{Z1}$ and $R_{Z2}$ is selected to be equal to a potential appearing at the output terminal b of the bridge circuit 2 at a predetermined reference temperature, for example, the room temperature of 20° C. The sensitivity temperature compensation circuit 1 and the zero-point temperature compensation circuit 3 are the same as those disclosed in JP-A-58-140604 referred already.

Another compensation circuit 4, which is an important feature of the resent invention, is connected between the other output terminal d and the other power supply terminal c of the bridge circuit 2 to compensate the aforementioned nonlinearity of the temperature characteristic of the output of the semiconductor strain gauge bridge circuit 2 in its no-loaded state. The resultant output $V_0$ of the semiconductor strain gauge bridge circuit 2 is derived across the output terminals b and d. This nonlinearity compensation circuit 4 is composed of a series connection of a thermistor $R_{ZTH}$ and a fixed resistor $R_{Z5}$. As will be described in detail later, the combination of the thermistor $R_{ZTH}$ and the resistor $R_{Z5}$ forming the nonlinearity compensation circuit 4 provides a temperature characteristic similar to the nonlinear temperature characteristic of the zero-point output of the semiconductor strain gauge bridge circuit 2.

Figure 2A:
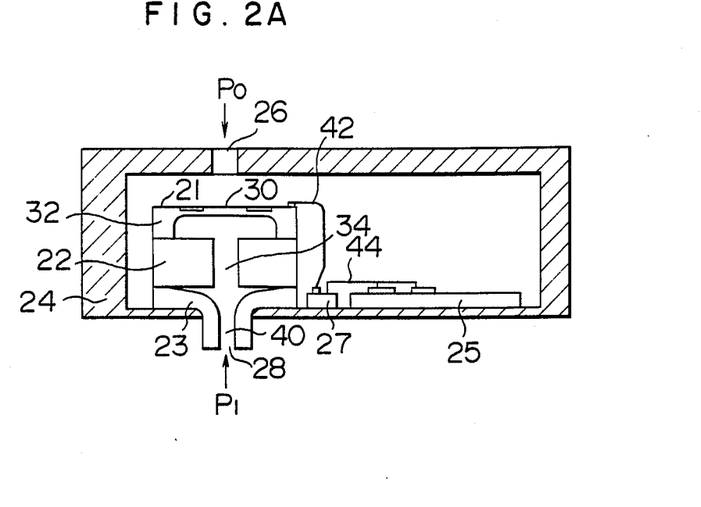
FIG. 2A is a partly sectional, side elevation view of a pressure transducer using the semiconductor strain gauge bridge circuit device of the present invention.
Figure 2B:
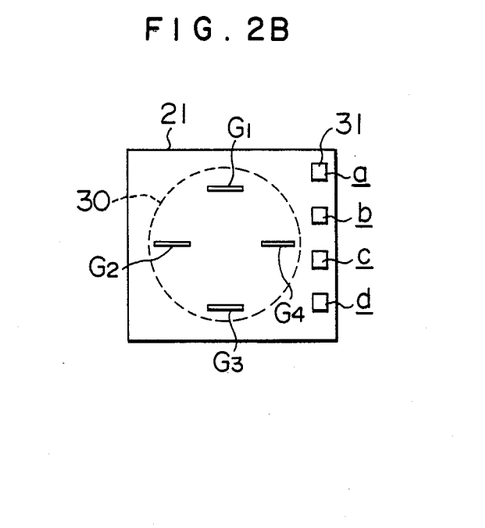
FIG. 2B is a top plan view showing an arrangement of the semiconductor strain gauges in the transducer shown in FIG. 2A.

FIGS. 2A and 2B show the structure of a pressure transducer using the semiconductor strain gauge bridge circuit device shown in FIG. 1. A square silicon chip 21, which is 3 mm long at each side and about 0.2 mm thick, is etched at a central area of its back side to form a circular thin film part 30, and the semiconductor strain gauges $G_1$ to $G_4$ are formed above the thin film part 30 by the technique of impurity diffusion. The semiconductor strain gauges $G_1$ to $G_4$ are connected into the bridge circuit form by a wiring technique well known in the art, and the terminals a, b, c and d of the bridge circuit are connected respectively to connection terminals 31 provided adjacent to one of the marginal edges of the silicon chip 21. The silicon chip 21 is fixed at its leg 32 to a glass substrate 22 supported on a pressure introducing member 23 of a plastic material. Aligned holes 34 and 40 extend through the glass substrate 22 and pressure introducing member 23 respectively, and a pressure P1 to be measured is applied to the back side of the thin film part 30 of the silicon chip 21. The individual resistive elements constituting the various compensation circuits 1, 3 and 4 shown in FIG. 1 are formed on a ceramic substrate 25, and the compensation circuits 1, 3 and 4 are connected by conductors 42 and 44 to the bridge circuit 2 through intermediate connection terminals 27. The body of the pressure transducer having the construction described above is housed in a plastic casing 24. The casing 24 is formed with a hole 26 which introduces a reference pressure $P_0$, such as, an external air pressure toward and onto the semiconductor strain gauges $G_1$ to $G_4$ in the pressure transducer. In the pressure transducer having the above construction, the semiconductor strain gauges and the thermistors in the compensation circuits are always subjected to the same temperature change, and the fixed resistors in the compensation circuits are also subjected to the same temperature change. However, because the fixed resistors are formed by a thick film deposition technique, and the rate of temperature-dependent change of the resistance of the fixed resistors is less than 1/10 of that of the semiconductor strain gauges, any change of the resistance of the fixed resistors in a practically operating temperature range of the pressure transducer is negligible.

Figure 3A:
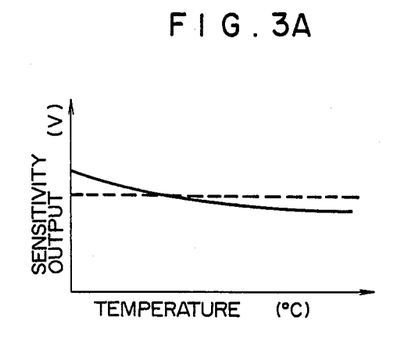
FIGS. 3A, 3B and 3C are graphs illustrating how the sensitivity temperature characteristic of the bridge circuit shown in FIG. 1 is compensated by the sensitivity temperature compensation circuit.
Figure 3B:
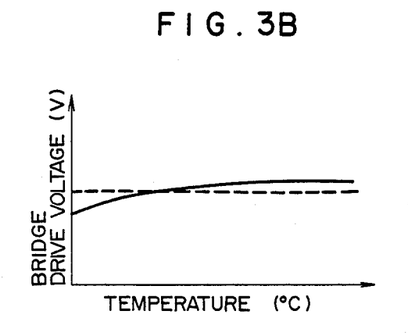
Figure 3C:
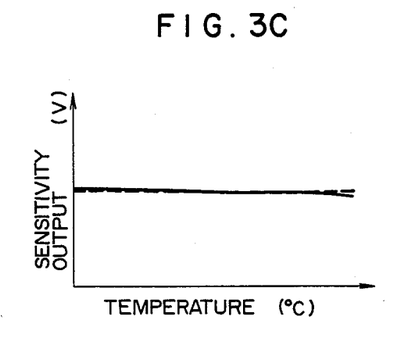

The temperature characteristic of the output of the circuit device shown in FIG. 1 will now be described. FIG. 3A shows how the bridge output (the sensitivity output) changes relative to a temperature change when a pressure of 60 is applied to the transducer under a condition where the power supply voltage $V_{IN}$ applied to the bridge circuit 2 is maintained constant. This sensitivity temperature characteristic shown in FIG. 3A is offset by a circuit having a temperature-output characteristic as shown in FIG. 3B, that is, more practically, by the sensitivity temperature compensation circuit 1 shown in FIG. 1. The sensitivity output compensated by the sensitivity temperature compensation circuit 1 is shown in FIG. 3C.

Figure 4A:
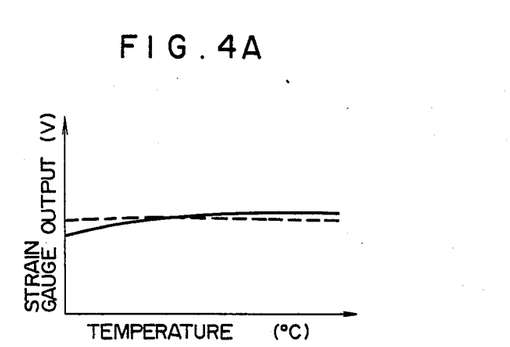
FIGS. 4A, 4B and 4C are graphs illustrating how the zero-point temperature characteristic of the bridge circuit shown in FIG. 1 is compensated by one form of the zero-point drift compensation circuit provided according to the present invention.
Figure 4B:
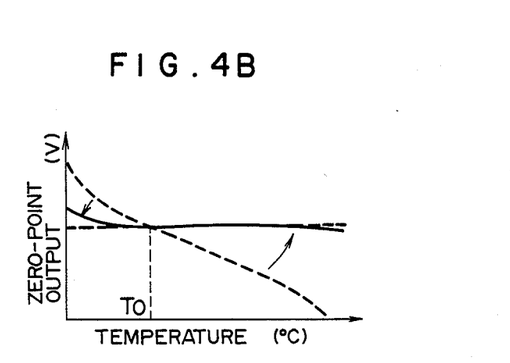

A zero-point output refers to the output of the bridge circuit 2 when the semiconductor strain gauges $G_1$ to $G_4$ are free from any strain, that is, when the pressure $P_1$ to be measured is equal to the reference pressure $P_0$. Next, how this zero-point output of the bridge circuit 2 changes relative to a temperature change will be described. Even when no differential pressure is applied to the semiconductor strain gauges $G_1$ to $G_4$, such a zero-point output appears from the bridge circuit 2 due to various factors. These factors include gauge-pattern errors occurring at the time of fabrication of the individual semiconductor strain gauges $G_1$ to $G_4$ constituting the bridge circuit 2, non-uniform resistivity attributable to different impurity concentrations at the time of impurity diffusion, and strain attributable to the difference between the coefficient of thermal expansion of the silicon chip 21 on which the strain gauges $G_1$ to $G_4$ are formed and that of the glass substrate 22 fixedly supporting the silicon chip 21. Thus, the semiconductor strain gauges $G_1$ to $G_4$ have an output-temperature characteristic as, for example, shown in FIG. 4A. Further, due to the various factors described above, the bridge circuit 2 constituted by such semiconductor strain gauges $G_1$ to $G_4$ generates a zero-point output which changes relative to the temperature change as shown by the broken curve in FIG. 4B.

Such a zero-point output vs. temperature characteristic of the bridge circuit 2 is compensated by the zero-point temperature compensation circuit 3 shown in FIG. 1. The manner of compensation is such that the characteristic curve is rotated around an output value detected at a reference temperature $T_0$ which is, for example, the room temperature of 20° C. The bridge output compensated by the zero-point temperature compensation circuit 3 is shown by the solid curve in FIG. 4B. It will be apparent from FIG. 4B that, according to the method of compensation including dividing the power supply voltage $V_{IN}$ to obtain a voltage equal to the bridge middle-point voltage detected at the reference temperature $T_0$ and applying that voltage to the output terminal b of the bridge circuit 2, the output-temperature characteristic itself of the bridge circuit 2 is not corrected, that is, the nonlinear output-temperature characteristic is not corrected into a linear one, but the output-temperature characteristic is corrected by rotating the characteristic curve around the output value detected at the reference temperature $T_0$. Thus, it is impossible to compensate a nonlinear drift of the bridge output characteristic at a point remote from the reference point $T_0$. Especially, it is impossible to compensate even an output error attributable to the nonlinearity of the characteristic in a low temperature range.

Figure 4C:
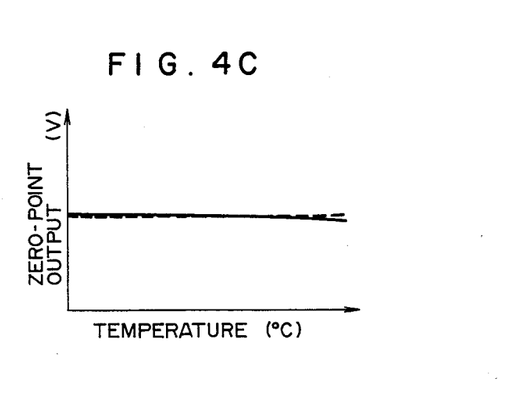

In order to eliminate the nonlinear drift of the bridge output characteristic, the nonlinearity compensation circuit 4 is provided in the semiconductor strain gauge bridge circuit device according to the present invention. By the function of this nonlinearity compensation circuit 4, the zero-point output vs. temperature characteristic of the bridge circuit 2 is flattened over a wide temperature range as shown in FIG. 4C.

Figure 5:
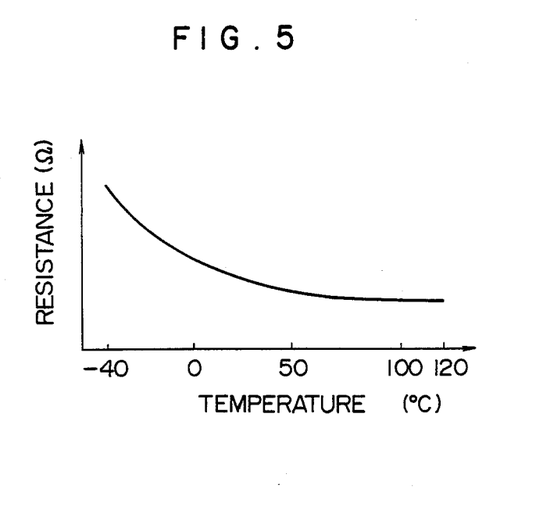
FIG. 5 is a graph showing the temperature-resistance characteristic of the thermistor used in the zero-point drift compensation circuit of the present invention.

The thermistor $R_{ZTH}$ used in the nonlinearity compensation circuit 4 has generally a negative and nonlinear temperature-resistance characteristic as shown in FIG. 5. Also, as will be apparent from FIG. 5, this characteristic of the thermistor $R_{ZTH}$ is similar to that of the semiconductor strain gauges. Therefore, the thermistor $R_{ZTH}$ is connected in series with the fixed resistor $R_{Z5}$, and this series connection is connected across one of the output terminals (the terminal d in the practical arrangement) and one of the power supply terminals (the terminal c in the practical arrangement) of the bridge circuit 2 to compensate the nonlinear drift of the bridge output.

Figure 6A:
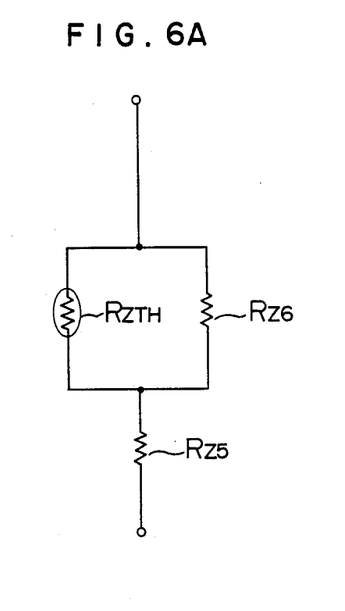
FIGS. 6A and 6B show modifications of the zero-point drift compensation circuit provided according to the present invention.
Figure 6B:
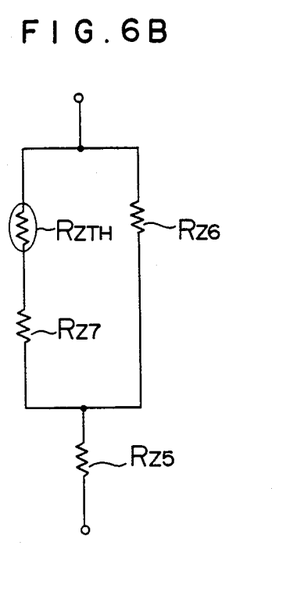

In the embodiment shown in FIG. 1, the thermistor $R_{ZTH}$ is connected in series with the fixed resistor $R_{Z5}$ to constitute the nonlinearity compensation circuit 4. Modifications of this nonlinearity compensation circuit 4 are shown in FIGS. 6A and 6B. In the modification shown in FIG. 6A, an additional fixed resistor $R_{Z6}$ is connected in parallel with the thermistor $R_{ZTH}$ which is connected in series with the fixed resistor $R_{Z5}$, so that a more suitable combination can be provided, and the nonlinear drift of the zero-point output of the bridge circuit 2 can be compensated with higher accuracy. In the modification shown in FIG. 6B, an additional fixed resistor $R_{Z7}$ is further inserted in series with the thermistor $R_{ZTH}$ in the modification shown in FIG. 6A. According to these modifications, the nonlinearity of the zero-point output vs. temperature characteristic peculiar to the semiconductor strain gauge bridge circuit 2 is approximated more by the temperature characteristic of the nonlinearity compensation circuit 4.

Figure 7:
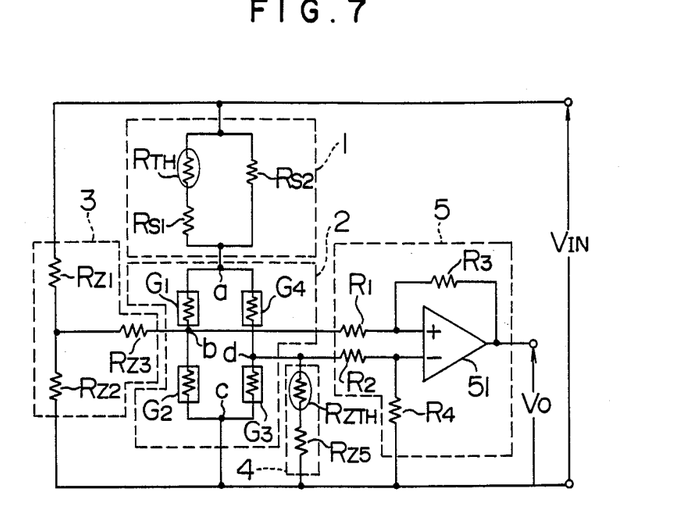
FIG. 7 is a circuit diagram of a pressure transducer of constant voltage drive type using the bridge circuit device shown in FIG. 1.

FIG. 7 is a circuit diagram showing the structure of a pressure transducer of constant voltage drive type in which an amplifier circuit 5 is directly connected to the output terminals b and d of the semiconductor strain gauge bridge circuit 2 shown in FIG. 1. In the structure of the pressure transducer shown in FIG. 7, the output terminals b and d of the bridge circuit 2 are connected through resistors $R_1$ and $R_2$ to a plus input terminal and a minus input terminal of an operational amplifier 51 respectively. The output voltage $V_0$ appears at an output terminal of the operational amplifier 51 and is fed back through a feedback resistor $R_3$ to the plus input terminal. Thus, the operational amplifier 51 operates as a voltage amplifier.

Figure 8:
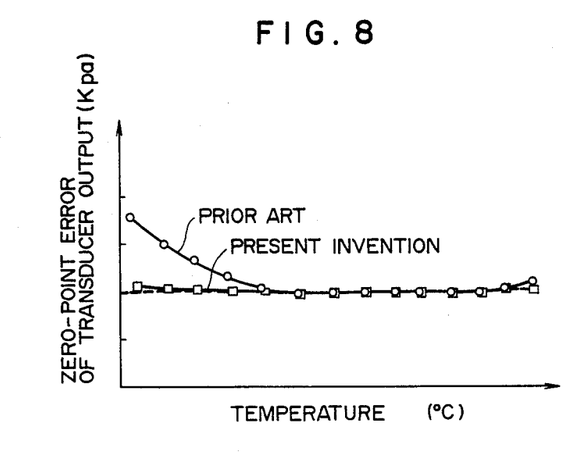
FIG. 8 is a graph showing the zero-point temperature characteristic of the pressure transducer shown in FIG. 7.

FIG. 8 shows a zero-point error of an actual output of the pressure transducer shown in FIG. 7 when compared with the case where zero-point temperature compensation by the conventional zero-point temperature compensation circuit 3 is only carried out. It will be apparent from FIG. 8 that, with zero-point temperature compensation by the conventional zero-point temperature compensation circuit 3 only, a large zero-point error attributable to the nonlinearity of the bridge output temperature characteristic curve occurs especially in a low temperature range of, for example, 0° C. to −40° C. Thus, sufficient compensation can be achieved in a limited temperature range only, and the pressure cannot be detected with sufficiently high accuracy. In contrast, the nonlinear zero-point drift described above can be compensated by the nonlinearity compensation circuit 4 according to the present invention, as seen in FIG. 8. Thus, the pressure can be measured with very high accuracy of less than ±1% over a very wide temperature range of, for example, −40° C. to +120° C.

Figure 9:
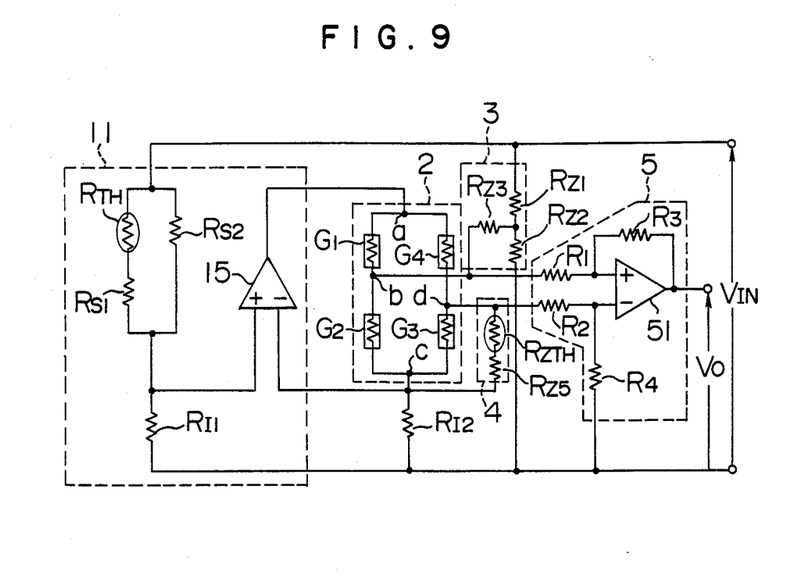
FIG. 9 is a circuit diagram of a pressure transducer of constant current drive type using the bridge circuit devices shown in FIG. 1.

FIG. 9 shows a pressure transducer of constant current drive type in which an amplifier circuit 5 is directly connected to the output terminals b and d of the semiconductor strain gauge bridge circuit 2 shown in FIG. 1. In the pressure transducer shown in FIG. 9, an operational amplifier 15 supplies a constant current to the input terminal a of the bridge circuit 2. A resistor $R_{I2}$ is connected to the other input terminal c of the bridge circuit 2, and a voltage signal appearing across this resistor $R_{I2}$ is applied to a minus input terminal of the operational amplifier 15 constituting a part of a sensitivity temperature compensation circuit 11. This sensitivity temperature compensation circuit 11 is the same as that disclosed in U.S. Pat. No. 4,337,665, issued to Sato et al on July 6, 1982. The sensitivity temperature compensation circuit 11 is provided to compensate a temperature-dependent change of the sensitivity of the semiconductor strain gauge bridge circuit 2 and controls its supply current depending on the temperature. This sensitivity temperature compensation circuit 11 includes a series connection of a thermistor $R_{TH}$ and a fixed resistor $R_{S1}$, another fixed resistor $R_{S2}$ connected in parallel with the series connection, and another fixed resistor $R_{I1}$ connected in series with the fixed resistors $R_{S1}$ and $R_{S2}$. The operational amplifier 15 is connected at its plus input terminal to the middle point of the resistor $R_{I1}$ and the series-parallel circuit of the thermistor $R_{TH}$ and fixed resistors $R_{S1}$, $R_{S2}$. In the pressure transducer having such a structure, the voltage corresponding to the current supplied to the bridge circuit 2 from the operational amplifier 15 is compared with the middlepoint voltage changing depending on the temperature, and, while comparing these voltages, the current supplied to the bridge circuit 2 is controlled to attain the desired sensitivity temperature compensation.

Figure 10:
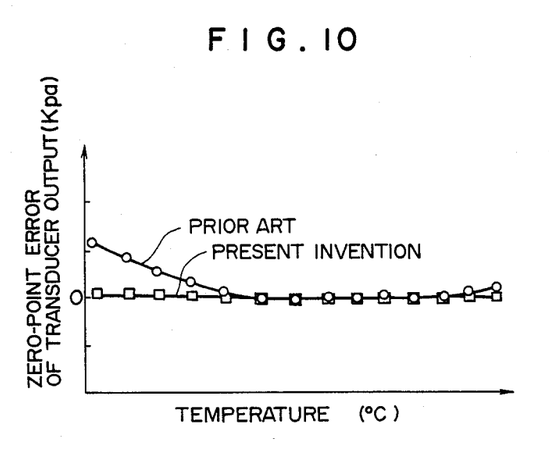
FIG. 10 is a graph showing the zero-point temperature characteristic of he pressure transducer shown in FIG. 9.

FIG. 10 shows a zero-point error of an actual output of the pressure transducer shown in FIG. 9 when compared with the case where zero-point temperature compensation by the zero-point temperature compensation circuit 3 is only carried out. In this case too, the zero-point output error can be suppressed to a predetermined level over a wide temperature range by the incorporation of the nonlinearity compensation circuit 4.

It will be understood from the foregoing detailed description that, according to the present invention, nonlinearity which appears in a zero-point output of a semiconductor strain gauge bridge circuit at temperatures outside of a predetermined temperature range, especially, at low temperatures and which could not be compensated by a prior art zero-point temperature compensation circuit, can be sufficiently compensated by a nonlinearity compensation circuit. Therefore, a pressure transducer can be provided in which zero-point temperature compensation is effected with high accuracy over a wide temperature range.

We claim:

1. A semiconductor strain gauge bridge circuit device comprising:
    a bridge circuit composed of semiconductor strain gauges and having a pair of power supply terminals to be connected to a power source and also having another pair of output terminals;
    a first zero-point temperature compensation circuit connected across said power supply terminals and having a junction point connected through a resistor to one of said output terminals, said junction point being at a potential, when said power supply terminals are connected to a power source, which is substantially equal to a potential appearing at said one output terminal at a predetermined temperature; and
    a nonlinearity compensation circuit connected across the other of said output terminals and one of said power supply terminals and having a non-linear temperature-resistance characteristic substantially the same as that of the semiconductor strain gauge bridge circuit so that a zero-point output versus temperature characteristic of the semiconductor strain gauge bridge circuit is substantially flattened over a predetermined temperature range that includes said predetermined temperature.

2. A semiconductor strain gauge bridge circuit device according to claim 1, wherein said nonlinearity compensation circuit includes a resistive element having a negative temperature-resistance characteristic and a fixed resistor connected in series with said resistive element.

3. A semiconductor strain gauge bridge circuit device according to claim 1, wherein said nonlinearity compensation circuit includes a resistive element having a negative temperature-resistance characteristic, a first fixed resistor connected in parallel with said resistive element, and a second fixed resistor connected in series with the parallel connection of said resistive element and said first fixed resistor.

4. A semiconductor strain gauge bridge circuit device according to claim 1, further comprising a sensitivity temperature compensation circuit through which the power source is connected to the other of said power supply terminals for compensating the temperature-dependent sensitivity of said bridge circuit.

5. A semiconductor strain gauge bridge circuit device according to claim 4, wherein said nonlinearity compensation circuit includes a resistive element having a negative temperature-resistance characteristic and a fixed resistor connected in series with said resistive element.

6. A semiconductor strain gauge bridge circuit device according to claim 4, wherein said nonlinearity compensation circuit includes a resistive element having a negative temperature-resistance characteristic, a first fixed resistor connected in parallel with said resistive element, and a second fixed resistor connected in series with the parallel connection of said resistive element and said first fixed resistor.

* * * * *